United States Patent
Nobuhara et al.

(10) Patent No.: US 11,401,871 B2
(45) Date of Patent: Aug. 2, 2022

(54) ENGINE SYSTEM

(71) Applicant: Yanmar Co., Ltd., Osaka (JP)

(72) Inventors: Tomoko Nobuhara, Osaka (JP); Takayuki Ikeda, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 164 days.

(21) Appl. No.: 16/494,418

(22) PCT Filed: Feb. 19, 2018

(86) PCT No.: PCT/JP2018/005680
§ 371 (c)(1),
(2) Date: Sep. 16, 2019

(87) PCT Pub. No.: WO2017/051002
PCT Pub. Date: Mar. 16, 2017

(65) Prior Publication Data
US 2021/0115858 A1    Apr. 22, 2021

(30) Foreign Application Priority Data

Mar. 16, 2017   (JP) .............................. JP2017-051002

(51) Int. Cl.
*F02C 9/26*       (2006.01)
*F02D 35/00*      (2006.01)
(Continued)

(52) U.S. Cl.
CPC ........... *F02C 9/26* (2013.01); *B60W 50/0205* (2013.01); *F02D 17/04* (2013.01);
(Continued)

(58) Field of Classification Search
CPC ........ F02C 9/26; F02D 35/0069; F02D 17/04; F02D 41/22; F25B 27/02; F05D 2220/32; B60W 50/0205; B60W 2520/04
(Continued)

(56) References Cited

U.S. PATENT DOCUMENTS

| 2002/0036483 A1 | 3/2002 | Kotani et al. |
| 2014/0236410 A1* | 8/2014 | Takizawa ................ B60L 58/13 |
| | | 180/65.265 |

(Continued)

FOREIGN PATENT DOCUMENTS

| JP | H07-174366 A | 7/1995 |
| JP | 2002-101560 A | 4/2002 |

(Continued)

OTHER PUBLICATIONS

International Search Report dated May 15, 2018 issued in corresponding PCT Application PCT/JP2018/005680.
Japanese Office Action dated Aug. 28, 2019 issued in corresponding JP Application 2017-051002.

*Primary Examiner* — Joseph J Dallo
*Assistant Examiner* — Yi-Kai Wang
(74) *Attorney, Agent, or Firm* — Norton Rose Fulbright US LLP

(57) ABSTRACT

An engine system including: an engine configured to output shaft power by burning fuel, and a system main portion configured to operate using the shaft power of the engine. The engine system further includes: an operation controlling unit, and a power source unit configured to convert commercial power to operating power and supply the operating power to the operation controlling unit. The power source unit includes: a system main portion-side power source unit configured to supply operating power for controlling the operation of the system main portion, and an engine-side power source unit configured to supply operating power for (Continued)

controlling the operation of the engine. The system main portion-side power source unit and the engine-side power source unit are provided individually and separately from each other.

20 Claims, 1 Drawing Sheet

(51) Int. Cl.
*F25B 27/02* (2006.01)
*F02D 41/22* (2006.01)
*F02D 17/04* (2006.01)
*B60W 50/02* (2012.01)

(52) U.S. Cl.
CPC ......... *F02D 35/0069* (2013.01); *F02D 41/22* (2013.01); *F25B 27/02* (2013.01); *B60W 2520/04* (2013.01); *F05D 2220/32* (2013.01)

(58) Field of Classification Search
USPC ...................................... 123/179.1
See application file for complete search history.

(56) References Cited

U.S. PATENT DOCUMENTS

| | | | |
|---|---|---|---|
| 2016/0244051 A1* | 8/2016 | Ikeda | B60K 6/40 |
| 2017/0030286 A1* | 2/2017 | Imaoka | F01P 7/16 |
| 2017/0253234 A1* | 9/2017 | Obitsu | B60L 3/08 |
| 2017/0282894 A1* | 10/2017 | Kamachi | B60W 20/13 |
| 2018/0058336 A1* | 3/2018 | Munevar | F01D 19/00 |

FOREIGN PATENT DOCUMENTS

| | | | | |
|---|---|---|---|---|
| JP | 2002-152972 A | | 5/2002 | |
| JP | 2007001360 | * | 5/2005 | |
| JP | 2007001360 | * | 6/2005 | |
| JP | 2006-317052 A | | 11/2006 | |
| JP | 2007-001360 A | | 1/2007 | |
| JP | 2008-140233 A | | 6/2008 | |
| JP | 2011-015486 A | | 1/2011 | |
| JP | 2013-190110 A | | 9/2013 | |
| JP | 5895165 B2 | * | 3/2016 | ............ H02J 1/102 |
| WO | 2013/076952 A1 | | 5/2013 | |

* cited by examiner

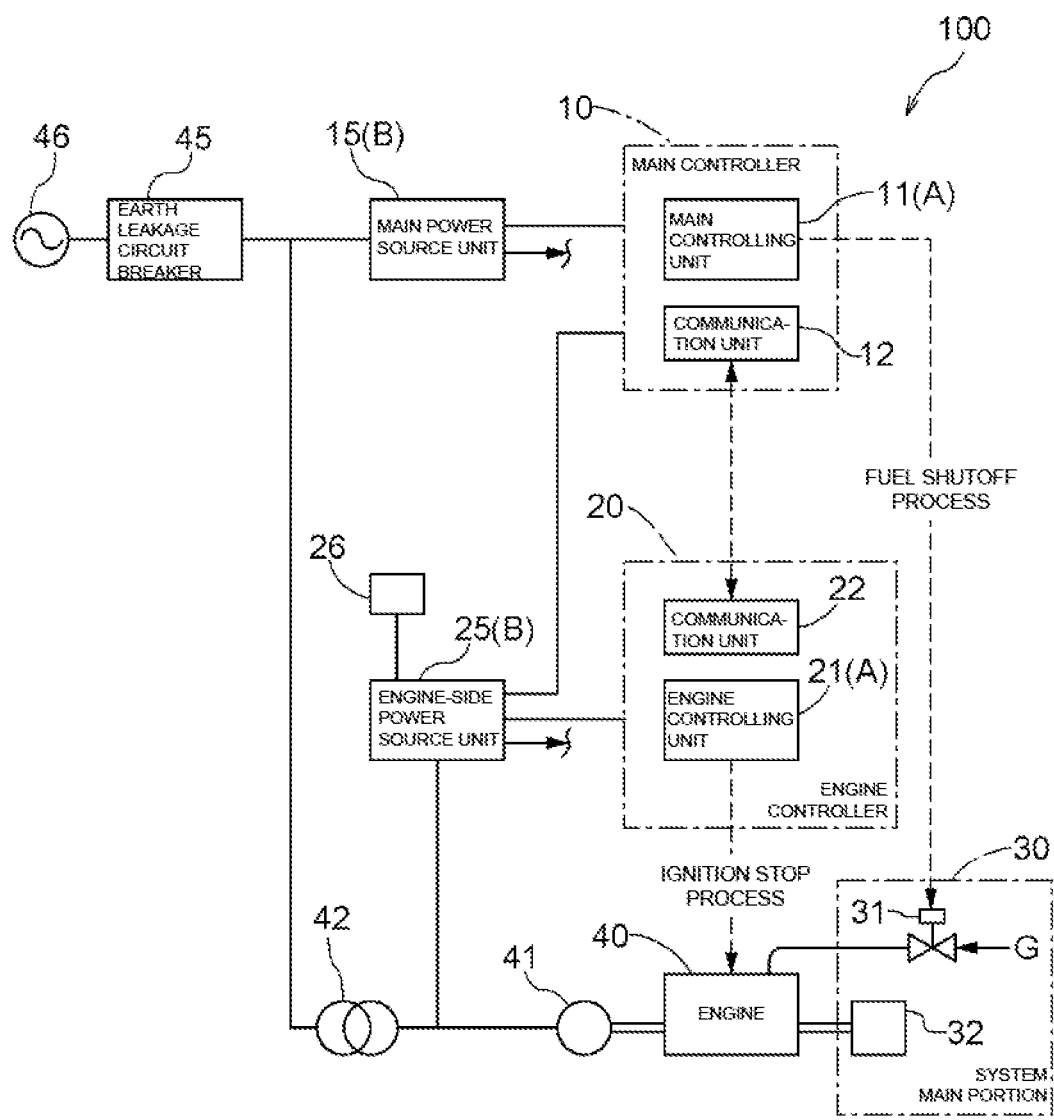

ENGINE SYSTEM

CROSS REFERENCES TO RELATED APPLICATIONS

This application is a national stage application pursuant to 35 U.S.C. § 371 of International Application No. PCT/JP2018/005680, filed on Feb. 19, 2018 which claims priority under 35 U.S.C. § 119 to Japanese Patent Application No. 2017-051002 filed on Mar. 16, 2017, the disclosures of which are hereby incorporated by reference in their entireties.

TECHNICAL FIELD

The present invention relates to an engine system including: an engine configured to output shaft power by burning fuel; and a system main portion configured to operate using the shaft power of the engine, the engine system further including:

an operation controlling unit; and a power source unit configured to convert commercial power to operating power and to supply the operating power to the operation controlling unit.

BACKGROUND ART

As such an engine system, an engine-driven heat pump system (hereinafter may be referred to as "GHP") has been known (for example, see Patent Literature 1 (PTL 1)). The heat pump system includes a heat pump circuit functioning as the system main portion and configured to transfer heat through circulation of refrigerant by a compressor, and the compressor is driven by the shaft power of the engine.

CITATION LIST

Patent Literature

PTL 1: Japanese Patent Application Laid-Open No. H07 (1995)-174366

SUMMARY OF INVENTION

Technical Problem

Such a known engine system has the following possible disadvantage: if a failure such as an electric leakage and a malfunction occurs in the power source unit, operation of both of the system main portion and the engine cannot be normally controlled, and therefore, the situation cannot be quickly dealt with, for example, by stopping the engine.

In view of the above circumstances, a main object of the present invention is to provide a technique which makes it possible to quickly deal with occurrence of a failure in a power source unit of an engine system, the engine system including: an engine configured to output shaft power by burning fuel; and a system main portion configured to operate using the shaft power of the engine, the engine system further including: an operation controlling unit; and the power source unit configured to supply operating power to the operation controlling unit.

Solution to Problem

In a first aspect of the present invention, an engine system includes: an engine configured to output shaft power by burning fuel; and a system main portion configured to operate using the shaft power of the engine, the engine system further including:

an operation controlling unit; and a power source unit configured to convert commercial power to operating power and to supply the operating power to the operation controlling unit.

The power source unit includes: a system main portion-side power source unit configured to supply operating power for controlling operation of the system main portion; and an engine-side power source unit configured to supply operating power for controlling operation of the engine, the system main portion-side power source unit and the engine-side power source unit being provided in a parallel manner.

In this aspect, if a failure such as an electric leakage and a malfunction occurs in the system main portion-side power source unit configured to supply operating power for controlling the operation of the system main portion, it is possible to keep the engine-side power source unit in a normal state, and to reliably supply operating power for controlling the operation of the engine. This makes it possible to control the operation of the engine, to cause the engine system to transition into an engine-stopped state or the like.

Meanwhile, if a failure such as an electric leakage and a malfunction occurs in the engine-side power source unit configured to supply operating power for controlling the operation of the engine, it is possible to keep the system main portion-side power source unit in a normal state, and to reliably supply operating power for controlling the operation of the system main portion. This makes it possible to control the operation of the system main portion.

Thus, the present invention can provide an engine system capable of dealing with occurrence of a failure in the power source unit.

In a second aspect of the present invention, the operation controlling unit includes a system main portion controlling unit and an engine controlling unit which are provided individually and separately, the system main portion controlling unit configured to receive operating power from the system main portion-side power source unit and to control operation of the system main portion, the engine controlling unit configured to receive operating power from the engine-side power source unit and to control operation of the engine.

In this aspect, the system main portion controlling unit and the engine controlling unit, each functioning as the operation controlling unit, are provided individually and separately. Because of this, if a failure occurs in one of these units, it is possible to keep the other unit in a normal state without being affected by the failure.

In a third aspect of the present invention, the system main portion controlling unit and the engine controlling unit are configured to be communicable with each other; and each of the system main portion controlling unit and the engine controlling unit is configured to perform an engine stop process of stopping the engine when detecting an error in communication with the other.

In this aspect, each of the system main portion controlling unit and the engine controlling unit can detect, by the function of communicating with the other, that a failure such as an electric leakage and a malfunction occurs on the other side. Each of the system main portion controlling unit and the engine controlling unit is configured to perform the engine stop process to reliably stop the engine when detecting such an error in the communication with the other.

In the fourth aspect of the present invention, the engine system further includes a starter transformer configured to step down commercial power and to supply the stepped down power to a starter of the engine, and the engine-side power source unit is configured to generate operating power using the power stepped down by the starter transformer.

In this aspect, it is possible to supply the power stepped down by the starter transformer to the engine-side power source unit, by effectively using the starter transformer of the engine. Due to this, a transformer configured to step down supplied power to desired operating power does not have to be provided in the engine-side power source unit, or such a transformer can be simplified if provided, leading to efficient generation of operating power.

In a fifth aspect of the present invention, the engine-side power source unit is configured so that one or more voltage changing units configured to change voltage of operating power are attachable to and detachable from the engine-side power source unit.

In this aspect, one or more voltage changing units are attachable to and detachable from the engine-side power source unit. This makes it possible to generate operating power of a required voltage by changing the voltage changing unit(s) as needed. Furthermore, the engine-side power source unit may be configured so that two or more voltage changing units are attachable to and detachable from the engine-side power source unit, so as to generate operating power of various voltages.

In a sixth aspect of the present invention, the engine system further includes a fuel shutoff valve capable of shutting off supply of fuel to the engine, and the operation controlling unit is configured to be capable of performing a fuel shutoff process of actuating the fuel shutoff valve to stop the engine in control of the operation of the system main portion.

In this aspect, when a failure occurs in the engine-side power source unit configured to supply operating power for controlling the operation of the engine, for example, it is possible to shut off the supply of fuel to the engine by performing the fuel shutoff process in the control of operation of the system main portion by the operation controlling unit, and thereby to reliably stop the engine.

BRIEF DESCRIPTION OF DRAWINGS

FIG. 1 A schematic configuration diagram of an engine system related to an embodiment.

DESCRIPTION OF EMBODIMENTS

An embodiment of the present invention will be described with reference to the drawing.

An engine system 100 shown in FIG. 1 is structured, for example, as a so-called engine-driven heat pump system (GHP) configured so that a compressor 32 of a heat pump circuit (not illustrated) in which refrigerant circulates is driven by an engine 40. The engine system 100 is provided with: the engine 40 configured to output shaft power by burning fuel G; and a system main portion 30 configured to operate using the shaft power of the engine 40. The system main portion 30 includes the compressor 32 and the like. The engine system 100 is further provided with: an operation controlling unit A configured to control operation; and a power source unit B. The power source unit B is configured to convert commercial power to operating power, and to supply the operating power to the operation controlling unit A. More specifically, the power source unit B is configured to convert alternating-current (AC) commercial power supplied from a commercial power source 46 to direct-current (DC) operating power through an AC-DC converter or the like, and to supply the operating power to the operation controlling unit A. It should be noted that no limitation is needed for the engine type, the fuel, and the like of the engine 40. For example, a reciprocating engine, gas turbine engine, or the like fueled by city gas can be used as the engine 40.

The operation controlling unit A includes: a main controlling unit 11 (an example of a system main portion controlling unit) configured to control operation of the system main portion 30; and an engine controlling unit 21 configured to control operation of the engine 40. The main controlling unit 11 and the engine controlling unit 21 are provided individually and separately.

Specifically, the main controlling unit 11 is installed in a main controller 10. The main controlling unit 11 is configured to control operation of a fuel shutoff valve 31 and other electric devices provided on a system main portion 30 side. Meanwhile, the engine controlling unit 21 is installed in an engine controller 20 which is different from the main controller 10. The engine controlling unit 21 is configured to control operation of a cooling water pump, an ignition device, and other electric devices provided on an engine 40 side.

The power source unit B configured to supply operating power to the operation controlling unit A includes: a main power source unit 15 (an example of a system main portion-side power source unit) configured to supply operating power for controlling the operation of the system main portion 30; and an engine-side power source unit 25 configured to supply operating power for controlling the operation of the engine 40. The main power source unit 15 and the engine-side power source unit 25 are provided in a parallel manner. The main power source unit 15 is configured to supply operating power for controlling the operation of the system main portion 30 to the main controller 10 in which the main controlling unit 11 is installed. The engine-side power source unit 25 is configured to supply operating power for controlling the operation of the engine 40 to the engine controller 20 in which the engine controlling unit 21 is installed. That is, (i) a main-side power supply board having the main power source unit 15 and (ii) an engine-side power supply board having the engine-side power source unit 25 are provided as power supply boards in the engine system 100 individually and separately.

The system main portion 30 is provided with the fuel shutoff valve 31 capable of shutting off the supply of the fuel G to the engine 40. The main controlling unit 11 is configured to be capable of performing a fuel shutoff process (an example of an engine stop process) of actuating the fuel shutoff valve 31 to force the engine 40 to stop.

Meanwhile, the engine controlling unit 21 is configured to be capable of performing an ignition stop process (an example of the engine stop process) of, for example, stopping application of voltage to a spark plug (not illustrated) of the engine 40 to force the engine 40 to stop.

Furthermore, the main controlling unit 11 and the engine controlling unit 21 are configured to be communicable with each other through a communication unit 12 installed in the main controller 10 and a communication unit 22 installed in the engine controller 20.

When the main controlling unit 11 communicates with the engine controlling unit 21 through the above-mentioned communication units 12 and 22 and then detects an error in the communication with the engine controlling unit 21, the main controlling unit 11 determines that a failure such as an electric leakage and a malfunction occurs in the engine controlling unit 21 or in the engine-side power source unit 25 configured to supply operating power to the engine controlling unit 21. When determining that a failure occurs on an engine controlling unit 21 side as above, the main controlling unit 11 stops the engine 40 by performing the above-described fuel shutoff process.

Meanwhile, when the engine controlling unit 21 communicates with the main controlling unit 11 through the above-mentioned communication units 12 and 22 and then detects an error in the communication with the main controlling unit 11, the engine controlling unit 21 determines that a failure such as an electric leakage and a malfunction occurs in the main controlling unit 11 or in the main power source unit 15 configured to supply operating power to the main controlling unit 11. When determining that a failure occurs on a main controlling unit 11 side as above, the engine controlling unit 21 stops the engine 40 by performing the above-described ignition stop process.

The engine-side power source unit 25 is configured to supply operating power for controlling the operation of the engine 40 to the engine controlling unit 21, and in addition, to supply operating power for controlling the operation of the system main portion 30 to the main controlling unit 11. That is, to the main controller 10 in which the main controlling unit 11 is installed, operating power is supplied not only from the main power source unit 15 but also from the engine-side power source unit 25. Due to this, if a failure such as an electric leakage and a malfunction occurs in either one of the main power source unit 15 and the engine-side power source unit 25, i.e., in one of the units functioning as the power source unit B, operating power is supplied from the other units functioning as the power source unit B, and this allows the main controlling unit 11 to operate normally. This further allows the main controlling unit 11 to perform the above-described fuel shutoff process, to reliably stop the engine 40.

The engine system 100 is provided with a starter transformer 42 configured to step down the commercial power supplied from the commercial power source 46 and to supply the power to a starter 41 of the engine 40.

The engine-side power source unit 25 is configured to generate operating power using the power stepped down by the starter transformer 42. Consequently, the power stepped down by the starter transformer 42 to a voltage of on the order of several tens of volts is supplied to the engine-side power source unit 25. Due to this, a transformer configured to step down supplied power to desired operating power does not have to be provided in the engine-side power source unit 25, or such a transformer can be simplified if provided, leading to efficient generation of operating power.

AC commercial power is directly supplied to the main power source unit 15 from the commercial power source 46 via an earth leakage circuit breaker 45. The main power source unit 15 may incorporate a transformer configured to step down the commercial power to 12 V, for example, which is the supply voltage of general electric devices. In this case, the main power source unit 15 supplies the operating power stepped down by the transformer to the main controlling unit 11 and to electric devices such as the fuel shutoff valve 31, which are on the system main portion 30 side and are controlled by the main controlling unit 11.

Meanwhile, the engine-side power source unit 25 is configured so that a voltage changing unit 26 is attachable to and detachable from the engine-side power source unit 25. The voltage changing unit 26 is structured by: a regulator configured to change the voltage of the power stepped down by the starter transformer 42; and the like. The voltage changing unit 26 can be attached, as an external device, to the engine-side power supply board having the engine-side power source unit 25. This enables the engine-side power source unit 25 to generate operating power of a voltage other than the general supply voltage. Furthermore, although not shown in the FIGURE, two or more voltage changing units 26 may be attached at the same time. This makes it possible to efficiently generate operating power of various voltages.

Other Embodiments (1) While in the above-described embodiment, the engine system 100 is structured as the engine-driven heat pump system (GHP), the engine system related to the present invention is applicable to systems each including an engine as a driving source. For example, the engine system is applicable to a cogeneration system or the like including a generator configured to be driven by an engine, the system configured so that the waste heat of the engine is used to supply hot water and/or to heat a room. The engine system is also applicable to an absorption refrigerator, a fuel cell system, and the like, each configured to use the waste heat of its engine while using shaft power of the engine to drive a system other than the engine system.

(2) In the above-described embodiment, the main controlling unit 11 is installed in the main controller 10 and the engine controlling unit 21 is installed in the engine controller 20. That is, the main controlling unit 11 and the engine controlling unit 21 are provided individually and separately. However, the present invention is not limited to this configuration, and another configuration is also possible. For example, a main controlling unit and an engine controlling unit may be installed in a common controller so that the common controller controls operation of a system main portion and operation of an engine. It should be noted that, also in this configuration, a main power source unit is configured to supply operating power for controlling the operation of the system main portion to the common controller, and an engine-side power source unit is configured to supply operating power for controlling the operation of the engine to the common controller.

(3) In the above-described embodiment, the engine stop process performed in the control of the operation of the system main portion 30 by the main controlling unit 11 is the fuel shutoff process of actuating the fuel shutoff valve 31, which is capable of shutting off the supply of fuel G to the engine 40, thereby to stop the engine 40. However, the present invention is not limited to this. The engine stop process by the main controlling unit 11 may be performed in a different manner, for example, by causing the main controlling unit 11 to stop power supply to the spark plug of the engine 40.

(4) In the above-described embodiment, each of the main controlling unit 11 and the engine controlling unit 21 is configured: when detecting an error in the communication with the other, to determine that a failure such as an electric leakage and a malfunction occurs in the operation controlling unit A and/or in the power source unit B on the other side; and to perform the engine stop process. However, the present invention is not limited to this configuration. The occurrence of a failure in the operation controlling unit A and/or in the power source unit B may be determined in a different manner, for example, by detecting current reduction or the like in the main power source unit 15 and in the engine-side power source unit 25.

(5) The above-described embodiment is configured so that the engine-side power source unit 25 supplies operating power to the main controlling unit 11 and to the engine controlling unit 21. However, the engine-side power source unit 25 does not have to supply power to the main controlling unit 11.

(6) In the above-described embodiment, the engine-side power source unit 25 is configured to generate operating power using the power stepped down by the starter transformer 42. However, the present invention is not limited to this configuration. For example, the following configuration is also possible: AC commercial power is directly supplied from the commercial power source 46 to the engine-side power source unit 25 via the earth leakage circuit breaker 45; and the engine-side power source unit 25 incorporates therein a transformer configured to step down the commercial power to a desired voltage.

(7) In the above-described embodiment, the voltage changing unit 26 attachable to and detachable from the engine-side power source unit 25 is provided. However, the present invention is not limited to this configuration. The voltage changing unit 26 does not have to be detachable. For example, a required number of voltage changing units 26 may be factory-installed in the engine-side power source unit 25.

INDUSTRIAL APPLICABILITY

The present invention is applicable to an engine system including a power source unit configured to convert commercial power to operating power and to supply the operating power to an operation controlling unit.

REFERENCE SIGNS LIST 11 main controlling unit (system main portion controlling unit)
15 main power source unit (system main portion-side power source unit)
21 engine controlling unit
25 engine-side power source unit
26 voltage changing unit
30 system main portion
31 fuel shutoff valve
40 engine
41 starter
42 starter transformer
100 engine system
A operation controlling unit
B power source unit
G fuel

The invention claimed is:

1. An engine system comprising:
an engine configured to output shaft power by burning fuel,
a system main portion configured to operate using the shaft power of the engine,
a fuel shutoff valve capable of shutting off a supply of fuel to the engine,
an operation controlling unit, wherein the operation controlling unit is configured to be capable of performing a fuel shutoff process to actuate the fuel shutoff valve to stop the engine in control of the operation of the system main portion, and
a power source unit configured to convert commercial power to operating power and supply the operating power to the operation controlling unit, wherein:
the power source unit comprises:
a system main portion-side power source unit configured to supply operating power for controlling operation of the system main portion;
an engine-side power source unit configured to supply operating power for controlling operation of the engine, and
the system main portion-side power source unit and the engine-side power source unit being provided in a parallel manner.

2. The engine system according to claim 1, wherein:
the operation controlling unit comprises a system main portion controlling unit and an engine controlling unit which are provided individually and separately,
the system main portion controlling unit is configured to receive operating power from the system main portion-side power source unit and control operation of the system main portion, and
the engine controlling unit is configured to receive operating power from the engine-side power source unit and control operation of the engine.

3. The engine system according to claim 2, wherein:
the system main portion controlling unit and the engine controlling unit are configured to be communicable with each other; and
each of the system main portion controlling unit and the engine controlling unit is configured to perform an engine stop process to stop the engine when detecting an error in communication with each other.

4. The engine system according to claim 1, further comprising a starter transformer configured to step down the commercial power and supply the stepped down commercial power to a starter of the engine, wherein
the engine-side power source unit is configured to generate operating power using the commercial power stepped down by the starter transformer.

5. The engine system according to claim 1, wherein the engine-side power source unit is configured so that one or more voltage changing units configured to change voltage of operating power are attachable to and detachable from the engine-side power source unit.

6. The engine system according to claim 1, wherein the system main portion includes a compressor of a heat pump system.

7. The engine system according to claim 6, wherein the engine is configured to drive the compressor.

8. The engine system according to claim 1, further comprising an engine controller configured to control operation of a cooling water pump of the engine and an ignition device of the engine, the engine controller configured to receive power from the engine-side power source unit.

9. The engine system according to claim 1, further comprising a starter transformer configured to receive a commercial power and discharge an operation power, the commercial power different from the operation power.

10. The engine system according to claim 9, wherein the operation power from the starter transformer is configured to be supplied to a starter of the engine.

11. The engine system according to claim 9, wherein the starter transformer separate from the engine-side power source unit.

12. The engine system according to claim 9, wherein the operation power from the starter transformer is configured to be supplied to the engine-side power source unit.

13. The engine system according to claim 9, wherein the commercial power corresponds to an alternating current power and the operation power corresponds to a direct current power.

14. The engine system according to claim 1, wherein the system main portion-side power source unit includes a transformer configured to receive a commercial power and discharge an operation power, the commercial power different from the operation power.

15. The engine system according to claim 14, wherein the commercial power corresponds to an alternating current power and the operation power corresponds to a direct current power.

16. The engine system according to claim 1, wherein the operation controlling unit is configured to perform the fuel shutoff process in response to detection of an error in communication between a system main portion controlling unit and an engine controlling unit.

17. The engine system according to claim 16, wherein the operation controlling unit comprises a system main portion controlling unit and an engine controlling unit which are provided individually and separately.

18. The engine system according to claim 17, wherein:
the system main portion controlling unit is configured to receive operating power from the system main portion-side power source unit and control operation of the system main portion; and
the engine controlling unit is configured to receive operating power from the engine-side power source unit and control operation of the engine.

19. The engine system according to claim 16, further comprising a starter transformer configured to step down the commercial power and supply the stepped down commercial power to a starter of the engine.

20. The engine system according to claim 1, further comprising a starter transformer configured to step down the commercial power and supply the stepped down commercial power to a starter of the engine.

* * * * *